United States Patent
Orr et al.

(10) Patent No.: US 8,044,792 B2
(45) Date of Patent: Oct. 25, 2011

(54) SYSTEM AND METHOD FOR CONTROLLING REMOTE SENSORS

(75) Inventors: David Orr, Philomath, OR (US); Jon A Brewster, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 404 days.

(21) Appl. No.: 12/254,949

(22) Filed: Oct. 21, 2008

(65) Prior Publication Data

US 2010/0045453 A1 Feb. 25, 2010

Related U.S. Application Data

(60) Provisional application No. 61/062,954, filed on Jan. 30, 2008.

(51) Int. Cl.
*G08B 29/00* (2006.01)
(52) U.S. Cl. . 340/506; 340/3.1; 340/539.1; 340/539.13; 73/1.01; 725/10
(58) Field of Classification Search ............... 725/10; 340/506, 3.1, 539.13, 539.1; 73/1.01
See application file for complete search history.

(56) References Cited

U.S. PATENT DOCUMENTS

| | | | |
|---|---|---|---|
| 6,484,080 | B2 | 11/2002 | Breed |
| 6,968,565 | B1 * | 11/2005 | Slaney et al. ............ 725/10 |
| 2005/0253703 | A1 * | 11/2005 | He et al. ............ 340/539.13 |
| 2006/0186199 | A1 | 8/2006 | Parker |
| 2007/0018828 | A1 | 1/2007 | Stewart et al. |
| 2008/0023813 | A1 | 1/2008 | Hartwell et al. |

OTHER PUBLICATIONS

Vago Muradian; Little Chip, Big Problem; Defensive News; Nov. 24, 2003; http://www.diig-csis.org.new/article.asp?ARTICLE_ID=31 &>; 4 pgs.

* cited by examiner

*Primary Examiner* — George Bugg
*Assistant Examiner* — Sisay Yacob

(57) ABSTRACT

A system and method for controlling one or more remote sensors includes wirelessly communicating with the sensors, monitoring operation of each one of the sensors, and causing any one of the sensors that is operating in an unauthorized manner to be disabled. In one embodiment, the sensors can include micro-mechanical structure supporting electronic circuitry. The electronic circuitry is capable of monitoring at least one performance parameter of the sensor, comparing the monitored parameter to a preset limit, and disabling the sensor if the preset performance limit is exceeded.

12 Claims, 2 Drawing Sheets

SYSTEM AND METHOD FOR CONTROLLING REMOTE SENSORS

CROSS-REFERENCE TO RELATED PATENT APPLICATIONS

This application claims the benefit of U.S. provisional patent application Ser. No. 61/062,954, filed on Jan. 30, 2008, entitled "System And Method For Controlling Remote Sensors".

BACKGROUND OF THE INVENTION

Position-determining sensors, such as accelerometers and gyroscopes, have many possible uses. Because some of these uses (for instance missile guidance, have national security issues, export of these devices, even for commercial purposes, is closely controlled.

Advances in Micro Electro-Mechanical Systems (MEMS) and other technologies facilitate low cost position-determining sensors that enable a host of consumer and commercial applications. However, the commercial business potential of these devices is greatly limited is greatly limited by governmental export restrictions. Because the high performance characteristics of these devices could potentially be diverted to enable military applications (such as ballistic missile technology), these devices encounter strict export restrictions.

DETAILED DESCRIPTION OF THE INVENTION

Figure 1:
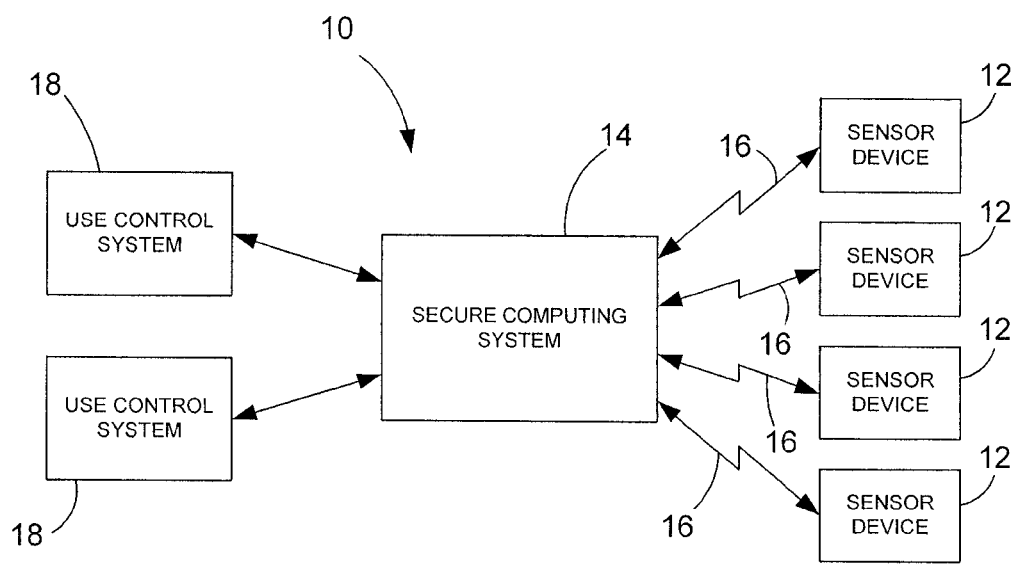
FIG. 1 is a block diagram showing one embodiment of a sensor control system.

Referring to the drawings wherein identical reference numerals denote the same elements throughout the various views, FIG. 1 shows one embodiment of a sensor control system 10 for controlling a number of remote sensor devices 12 that are being used in the field by one or more commercial entities in a variety of different applications. Four such remote sensor devices 12 are shown in FIG. 1 for the sake of example, but it should be noted that the sensor control system 10 can work with any number of sensor devices. In fact, the system 10 is well suited for controlling large numbers of remote sensor devices 12. The nature of the present invention is such that the remote sensors 12 can be dispersed globally in many different countries. The operator of the system 10 (which can be, for example, the United States Government) is able to audit the use of all sensors 12 to control their usage and prevent improper use.

In one embodiment, the remote sensor devices 12 are position-determining sensors, such as accelerometers and gyroscopes. Such sensors, particularly high performance position-determining sensors using MEMS technology, tend to be subject to export restrictions. Because of these export restrictions, use of the sensors 12 would normally be extremely limited with respect to purpose and/or geographical location. For example, it may be acceptable to use a MEMS accelerometer for controlling a down-hole drill bit, but the government would not want the same device to be used in a missile guidance system in export-controlled countries. The sensor control system 10 allows the remote sensors 12 to be used in the field, including in export-controlled countries, in a manner that will not violate the export restrictions. The control system 10 thus enables widespread commercial use of export-restricted sensors 12. That is, the export-restricted sensors 12 are placed in the field for an authorized, limited use only, and the control system 10 provides multiple layers of protection to ensure that the sensors 12 cannot be used for any unauthorized purposes.

In one layer of protection, the usage and operation of each sensor 12 is monitored to ensure that each sensor 12 is being used for its intended purpose only. If one or more of the sensors 12 are detected as being used in an unauthorized manner, those sensors are immediately disabled by the sensor control system 10. Another layer of protection comprises an internal sensor control. Each sensor 12 has a built-in functionality wherein an individual sensor automatically disables itself if it exceeds certain performance limits, described in more detail below. Furthermore, the sensors 12 can be constructed with layered architectures that are not physically separable without destroying the sensor's functionality.

The sensor control system 10 includes a secure computing system 14 that communicates with the remote sensor devices 12 via wireless communication links 16. The wireless communication links 16 can employ any suitable wireless technology. In one embodiment, the wireless communication links 16 utilize a long-range wireless technology capable of transmitting digital information, such as a satellite radio system or a cellular phone network. The secure computing system 14 is thus able to communicate with sensors 12 dispersed across the globe. The sensor control system 10 also includes one or more use control systems 18 that communicate with the secure computing system 14 via secure network interfaces. The use control system or systems 18 are the means, such as a computer terminal, by which the person or persons authorized to control the remote sensors 12 accomplish that control. Basically, the use control systems 18 are user interfaces that allow the operator to manipulate the secure computing system 14 to control the sensors 12 in a desired manner. For example, the operator can use a use control system 18 to manually deactivate some or all of the remote sensors 12 in the field. This would include giving the operator the ability to disable an entire class of sensors. The operator can also use a use control system 18 to modify the permitted performance limits of remote sensors 12 in the field or to set performance limits for new sensors being placed in the field.

The secure computing system 14 is a "trusted system," that is, a secure network and storage system. The secure computing system 14 individually controls the operation of each remote sensor device 12 by exchanging signals with each remote sensor 12. In one embodiment, the secure computing system 14 receives input from each remote sensor 12 regarding its operation and usage (i.e., "operational data") via the wireless communication links 16. If a sensor 12 is operating outside of its preset performance limits, the secure computing system 14 causes that sensor 12 to be automatically disabled. The operator can also manually disable one or more of the remote sensors 12 by using the use control system 18 to cause the secure computing system 14 to send disable commands to the selected remote sensors 12.

In one embodiment, the secure computing system 14 includes multiple network security processors (NSPs) that use encryption technology embedded in the hardware to safeguard sensitive data over private and public networks. The secure computing system 14 also includes a security engine that performs all cryptographic functions and stores security-relevant data such as cryptographic key components. The secure computing system 14 can also store data relating to the permitted performance limits for each sensor being monitored and controlled by the system 10.

As mentioned above, the secure computing system 14 communicates with each of the sensors 12 to monitor each sensor's operation and ensure the sensors 12 are all operating in their intended manner. Many possible communication protocols or methodologies are possible. For example, in one possible methodology, the remote sensors 12 all periodically send signals to the secure computing system 14 informing the secure computing system 14 how the sensor is operating. The secure computing system 14 allows the remote sensor 12 to operate as long as the remote sensor 12 is operating within the prescribed limits. But if the secure computing system 14 detects that the remote sensor 12 is operating outside of the prescribed limits, then the secure computing system 14 will send a disable command to the remote sensor 12, which will cause the remote sensor 12 to disable itself.

In another possible methodology, the secure computing system 14 periodically sends an authentication or "continue to operate" command to each remote sensor 12 and each remote sensor 12 operates for a predetermined period of time after receiving the "continue to operate" command. If the remote sensor 12 has not received another "continue to operate" command at the end of the predetermined period, it issues an internal disable command, causing the remote sensor 12 to disable itself. The "continue to operate" commands can be in the form of authentication codes. The sensor's control circuitry compares the received authentication code to an internal, on-board database of authentication codes. If the received authentication code matches an authentication code in the database, the control circuitry continues sensor operation. If the received authentication code does not match an authentication code in the database, the control circuitry disables the sensor. With this scheme, an external "disable" command is accomplished by purposely sending an incorrect authentication code.

In still another possible methodology, each remote sensor 12 continuously sends signals informing the secure computing system 14 of how the sensor 12 is operating. In response, the secure computing system 14 continuously transmits "continue to operate" or "disable" commands based on the use information audit from each remote system.

Security of the wireless communication links 16 can be accomplished using any suitable network authentication technology. Unlike Internet security systems, the authentication system for the wireless communication links 16 is not concerned with the messages between the remote sensors 12 and the secure computing system 14 being read. Security of the wireless communication links 16 is only concerned with authentication of the messages. In other words, the present invention wants to prevent unauthorized "continue to operate" or "disable" commands from being transmitted to the remote sensors 12 or bogus signals regarding the operation of remote sensors being transmitted to the secure computing system 14. Many possible network communication authentication protocols can be used for this purpose. One such protocol is the Password Authentication Protocol (PAP) in which the destination of the message (i.e., the endpoint) initiates the process by sending an Authenticate-Request packet to the authenticator. The packet includes the user's authentication credentials—the username and password—in plaintext. The authenticator compares the password to that stored for the user and determines whether the user can access the network. The authenticator either allows the endpoint access and sends an Authenticate-Ack, or denies the endpoint access and sends an Authenticate-Nak.

Another possible network communication authentication protocol is the Challenge-Handshake Authentication Protocol (CHAP). The protocol is initiated by the authenticator sending a challenge to the endpoint. In response, the endpoint sends usernames and passwords for authentication credentials to the authenticator, but the credentials are not sent in plaintext. Instead, the endpoint hashes the password to protect it from interception. A one-way hash is thus sent to the authenticator to be compared to the hash stored for the user. To prevent hackers from simply capturing and resending the hash of a user's password, different challenges include different values. Both the endpoint and the authenticator include the current challenge value in the hash. The authenticator compares the password to that stored for the user and determines whether the user can access the network. The authenticator either allows the endpoint access and sends an Authenticate-Ack, or denies the endpoint access and sends an Authenticate-Nak.

Yet another possible network communication authentication protocol is the Extensible Authentication Protocol (EAP). This framework follows the basic three-way handshake of CHAP: challenge, response, and result (success or failure). The initial request and response initiate the process; however, they do not transmit any authentication credentials. Instead, the user and authenticator exchange credentials as dictated by the particular EAP method. This exchange can be a simple two-step request and response. The exchange can also be more complex—involving, for example, the negotiation of a secure tunnel to exchange credentials. Based on the result of the exchange, the authenticator determines whether the user can access the network.

Figure 2:
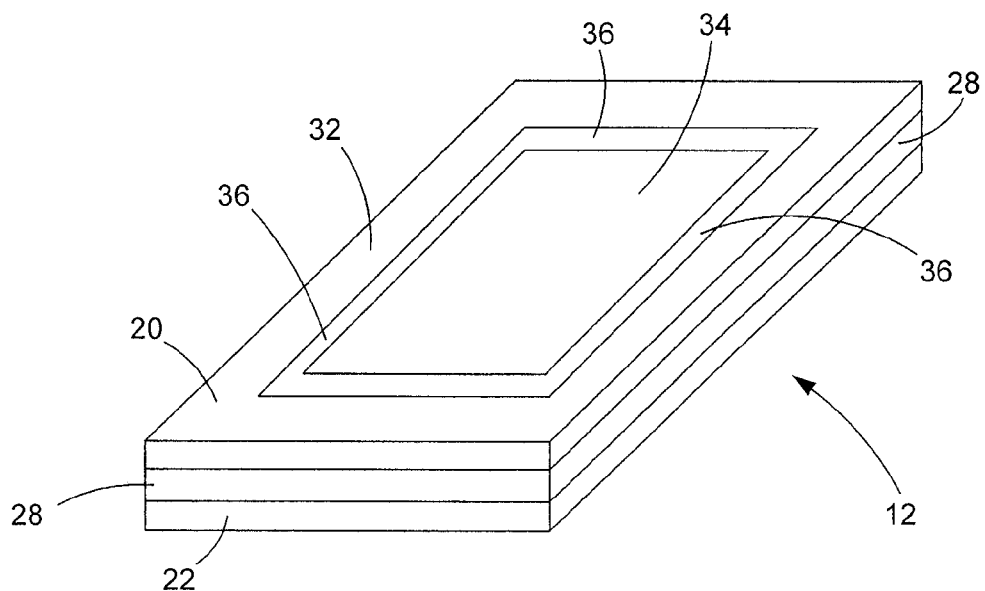
FIG. 2 is a perspective view of one embodiment of a sensor that can be used with the sensor control system.
Figure 3:
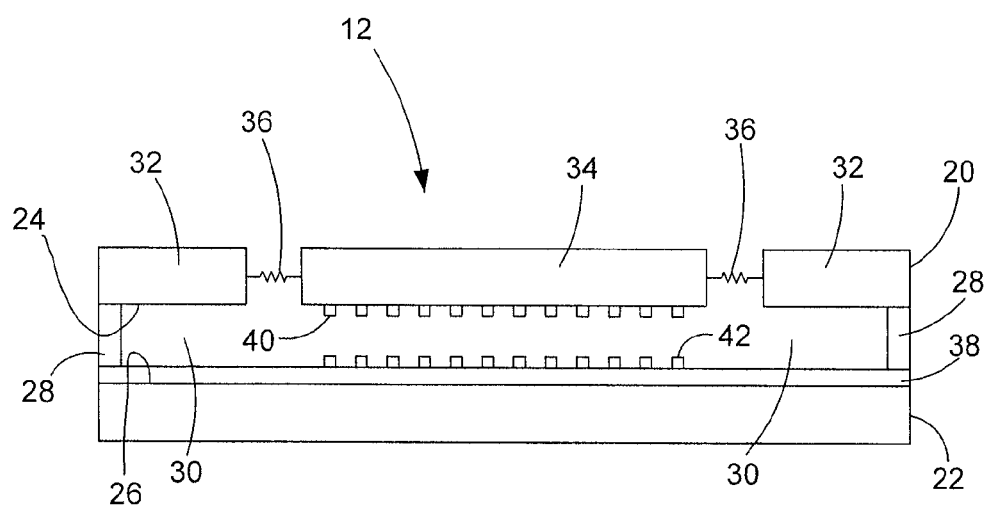
FIG. 3 is a cross-sectional view of the sensor of FIG. 2.

Referring to FIGS. 2 and 3, one possible configuration of a sensor 12 for use with the system 10 is shown. In this illustrated embodiment, the sensor 12 is a MEMS accelerometer having micro-mechanical structure coupled with microelectronics. However, it should be noted that the present invention is not limited to MEMS accelerometers and is applicable to many types of sensors. The sensor 12 includes a first wafer 20 and a second wafer 22 connected together in a stacked arrangement. Additional wafers could be added to the stack. As shown in FIGS. 2 and 3, the first wafer 20 is positioned above the second wafer 22 such that the bottom surface 24 of the first wafer 20 and the upper surface 26 of the second wafer 22 are facing each other. However, it should be noted that the sensor 12 could assume any possible orientation wherein the first wafer 20 is not necessarily positioned above the second wafer 22. Thus, the terms "upper" and "lower" are used herein only as a matter of convenience as corresponding to the illustrated embodiment and not in any limiting sense.

The first and second wafers 20, 22 are bonded together along their respective perimeters by a bonding material 28. The bonding material 28 separates the first and second wafers 20, 22 a small distance to define a gap 30 between the bottom surface 24 of the first wafer 20 and the upper surface 26 of the second wafer 22. The gap 30 is sealed by the bonding material 28 to create a sealed cavity. This cavity may be a vacuum or can be filled with a dielectric such as an inert gas. Examples of suitable inert gases include argon, helium, nitrogen and the like.

The first wafer 20 includes an outer frame portion 32 surrounding a central moveable portion 34. The outer frame portion 32 is directly bonded to the second wafer 22 and therefore is not capable of movement relative to the second wafer 22. The moveable portion 34 is capable of moving relative to the outer frame portion 32, and thus the second wafer 22. In the illustrated embodiment, the moveable portion 34 is supported from the frame portion 32 by a number of flexures 36. The flexures 36 allow the moveable portion 34 to move in any direction (i.e., parallel and/or perpendicular) relative to the frame portion 32. The moveable portion 34 thus behaves as an inertial mass that moves relative to the frame portion 32 and the second wafer 22 when acted upon by a force, such as what occurs when the sensor 12 undergoes a change in acceleration. In one possible fabrication process, the first wafer 20 can be trenched to form outer frame portion 32 and the moveable portion 34. Furthermore, the flexures 36 can be formed in the first wafer 20 by etching, such as plasma etching or reactive ion etching, or by other micromachining processes.

The second wafer 22 includes electronic circuitry 38 formed thereon. In one embodiment, the electronic circuitry 38 is in the form of a CMOS layer integrally formed on the upper surface 26 of the second wafer 22. The electronic circuitry 38 comprises the sensor's control circuitry (mentioned above) and can include storage means for storing a database of authentication codes.

The sensor 12 further includes a first set of electrodes 40 formed on the bottom surface 24 of the central moveable portion 34 of the first wafer 20 and a second set of electrodes 42 formed on top of the electronic circuitry 38 on the upper surface 26 of the second wafer 22. Although FIG. 3 shows a particular number of first and second electrodes 40, 42, the number of electrodes 40, 42 shown is for illustrative purposes only and it should be noted that any suitable number of electrodes could be used. The first set of electrodes 40 is electrically connected to the electronic circuitry 38 via conductors running along the flexures 36 and through the bonding material 28. The bonding material 28 may be made to be electrically conductive as an alternative to having a conductor running therethrough. The second set of electrodes 42 is also electrically connected to the electronic circuitry 38.

With this arrangement, when the sensor 12 undergoes acceleration, the resulting force acting upon the moveable portion 34 moves the moveable portion 34 relative to the frame portion 32, and the second wafer 22. The first set of electrodes 40 in turn moves relative to the second set of electrodes 42. This relative motion can be sensed by the electronic circuitry 38 to detect acceleration. For example, the two sets of electrodes 40, 42 can function as capacitive plates for position detection. The capacitance between the two sets of electrodes will change as the overlap of the electrodes 40, 42 changes due to parallel relative motion of the electrodes and/or as the distance between the electrodes 40, 42 changes due to perpendicular relative motion of the electrodes. The magnitude of the capacitance change is thus indicative of the acceleration the sensor 12 is undergoing. Thus, the sensor 12 functions as an accelerometer by measuring acceleration as a function of the detected capacitance change.

The sensor 12 further includes a wireless communication package that enables to the control circuitry to communicate with the secure computing system 14. The wireless communication package can be incorporated in the electronic circuitry 38, or it can be separate structure that interfaces with the electronic circuitry 38.

The sensor 12 is constructed such that if the second wafer 22 is removed from the device, the electrical connection between the electronic circuitry 38 and the central moveable portion 34 (and thus the first set of electrodes 40) is destroyed, which would destroy the sensor's ability to function as an accelerometer. The electronic circuitry 38 might continue to function, but without the signals from the first set of electrodes 40, the system would not be able to operate as an accelerometer. Even if the two wafers 20, 22 were reconnected in an attempt to subvert the intended purpose of the sensor 12, the physical distance between the wafers could not be controlled adequately and the device would fail to function.

As mentioned above, the sensor 12 has a built-in functionality wherein its control circuitry automatically disables the sensor 12 if certain performance limits are exceeded. The sensor 12 becomes "disabled" in the sense that it is no longer able to operate or perform its inherent sensing function. This can, but does not necessarily, mean that the sensor is subjected to some manner of physical destruction. To accomplish this functionality, the control circuitry is designed to be capable of monitoring certain performance parameters and comparing the monitored parameters to preset limits for the performance parameters. For example, the control circuitry could monitor the acceleration detected by the sensor 12 and automatically disable the sensor 12 if the detected the acceleration exceeded a preset limit. The preset limit would be set at a level such that acceleration above the limit would be indicative of the sensor 12 being used for an improper use (e.g., if the sensor detected a very high acceleration, this would indicate use in a missile guidance system as opposed to use in controlling a down-hole drill bit). Other useful performance parameters that could be monitored include velocity, which is easily calculated from the measured acceleration, and altitude, which would require additional means for measuring.

Disablement of the sensors could be accomplished by a series of fusible links built into the electronic circuitry 38. For instance, when the control circuitry detects that the preset limits are exceed, it could simultaneously fire a number of transistors in the electronic circuitry 38 creating an overload causing irreparable damage to the sensor 12. This same mechanism could be used to disable the sensor 12 in response to receipt of a disable command from the secure computing system 14.

While specific embodiments of the present invention have been described, it should be noted that various modifications thereto can be made without departing from the spirit and scope of the invention as defined in the appended claims.

What is claimed is:

1. A system for controlling one or more remote sensors, said system comprising:
   means for wirelessly communicating with said sensors;
   means for monitoring operation of each one of said sensors; and
   means for, responsive to determining that an one of said sensors' actual performance exceeds preset performance limits, causing the one of said sensors that is functionally correctly operating but in an unauthorized manner to be disabled,
   wherein each sensor's preset performance limit is set so that performance of the sensor outside of the performance limit is indicative of the unauthorized manner of operation of the sensor even where the sensor is functionally correctly operating.

2. The system of claim 1 wherein said means for monitoring comprises:
   means for receiving operational data from each sensor; and
   means for comparing said operational data to preset limits for each sensor.

3. The system of claim 2 further comprising means for setting said preset limits.

4. The system of claim 1 wherein the preset performance limit of each sensor corresponds to a predetermined acceleration, such that acceleration of the sensor greater than the predetermined acceleration is indicative of the unauthorized manner of operation of the sensor even where the sensor is functionally correctly operating.

5. The system of claim 2 wherein said operational data relates to sensor velocity.

6. The system of claim 2 wherein said operational data relates to sensor altitude.

7. The system of claim 1 wherein said means for causing the any one of said sensors that is operating in the unauthorized manner to be disabled sends a disable command to the any sensor that is operating in the unauthorized manner.

8. The system of claim 1 wherein the unauthorized manner comprises the operation of the sensor in a missile guidance system.

9. A method for controlling one or more remote sensors, said method comprising:
   monitoring operation of each one of said sensors by monitoring actual performance of each sensor;
   determining if any sensor is functionally correctly operating but in an unauthorized manner, by comparing if the actual performance of the any sensor exceeds preset performance limits for said sensors; and
   disabling any sensor that is operating in an unauthorized manner,
   wherein each sensor's preset performance limit is set so that performance of the sensor outside of the performance limit is indicative of the unauthorized manner of operation of the sensor even where the sensor is functionally correctly operating.

10. The method of claim 9 wherein the preset performance limit of each sensor corresponds to a predetermined acceleration, such that acceleration of the sensor greater than the predetermined acceleration is indicative of the unauthorized manner of operation of the sensor even where the sensor is functionally correctly operating.

11. The method of claim 9 wherein the unauthorized manner comprises the operation of the sensor in a missile guidance system.

12. The method of claim 9 wherein monitoring operation of said sensors includes receiving signals relating to sensor operation from each sensor, and disabling sensors operating in the unauthorized manner includes sending a disable command to such sensors.

* * * * *

UNITED STATES PATENT AND TRADEMARK OFFICE
CERTIFICATE OF CORRECTION

| | | |
|---|---|---|
| PATENT NO. | : 8,044,792 B2 | Page 1 of 1 |
| APPLICATION NO. | : 12/254949 | |
| DATED | : October 25, 2011 | |
| INVENTOR(S) | : David Orr et al. | |

It is certified that error appears in the above-identified patent and that said Letters Patent is hereby corrected as shown below:

In column 6, line 47, in Claim 1, delete "an" and insert -- any --, therefor.

In column 6, line 49, in Claim 1, after "the" insert -- any --.

Signed and Sealed this
Seventeenth Day of July, 2012

David J. Kappos
*Director of the United States Patent and Trademark Office*